(12) United States Patent
Rhodes

(10) Patent No.: US 7,531,099 B1
(45) Date of Patent: May 12, 2009

(54) WATER SURGE INTERFACE SLOT FOR THREE PHASE SEPARATOR

(75) Inventor: James E. Rhodes, Farmington, NM (US)

(73) Assignee: Process Equipment & Service Company, Inc., Farmington, NM (US)

( * ) Notice: Subject to any disclaimer, the term of this patent is extended or adjusted under 35 U.S.C. 154(b) by 820 days.

(21) Appl. No.: 11/163,377

(22) Filed: Oct. 17, 2005

(51) Int. Cl.
*E21B 43/34* (2006.01)

(52) U.S. Cl. .................. 210/800; 210/188; 210/522; 210/537; 95/253; 96/184

(58) Field of Classification Search ............ 210/188, 210/800–808, 513, 521–540; 95/253; 96/184
See application file for complete search history.

(56) References Cited

U.S. PATENT DOCUMENTS

| | | | |
|---|---|---|---|
| 2,656,006 A | 10/1953 | Wilson | 183/2.7 |
| 2,726,729 A | 12/1955 | Williams | 183/2.7 |
| 2,869,675 A * | 1/1959 | Coggins | 95/253 |
| 3,012,629 A | 12/1961 | Walker et al. | 183/2.7 |
| 3,119,674 A | 1/1964 | Glasgow et al. | 55/20 |
| 3,312,044 A | 4/1967 | McCarter | 55/168 |
| 3,394,530 A | 7/1968 | O'Neill et al. | 55/166 |
| 3,405,509 A | 10/1968 | Coggins | 55/160 |
| 3,476,678 A | 11/1969 | Murdock, Sr. | 204/308 |
| 4,208,196 A | 6/1980 | Coggins et al. | 55/174 |
| 4,257,895 A | 3/1981 | Murdock | 210/243 |
| 4,583,998 A | 4/1986 | Reid et al. | 55/45 |
| 4,686,938 A | 8/1987 | Rhodes | 122/4 |
| 4,693,808 A | 9/1987 | Dewitz | 208/113 |
| 4,860,591 A | 8/1989 | Garland | 73/861.04 |
| 4,978,373 A | 12/1990 | Endacott | 55/165 |
| 5,415,776 A | 5/1995 | Homan | 210/519 |
| 6,458,191 B1 | 10/2002 | Lingelem et al. | 96/209 |
| 6,537,458 B1 | 3/2003 | Polderman | 210/801 |

* cited by examiner

*Primary Examiner*—Terry K Cecil
(74) *Attorney, Agent, or Firm*—Head, Johnson & Kachigian

(57) ABSTRACT

A three phase separator to separate a fluid into three phases. A horizontal tank forms a fluid container having an inlet to the container in order to permit entry of a three phase fluid. An oil box within the fluid container includes a bottom and at least one baffle separating the oil box from the fluid container. A water box within the fluid container includes a bottom and at least one baffle separating the water box from the container. A water removal mechanism is in communication with the water box to draw water therefrom. An oil removal mechanism is in communication with the oil box to draw oil therefrom. A gas outlet permits removal of gas from the fluid container. A slot through the baffle of the water box permits entry of water from the fluid container into the water box in the event of a water surge.

16 Claims, 4 Drawing Sheets

WATER SURGE INTERFACE SLOT FOR THREE PHASE SEPARATOR

BACKGROUND OF THE INVENTION

1. Field of the Invention

The present invention is directed to an apparatus and a method to provide a three phase separator to separate well stream fluid into three phases—liquid hydrocarbon, water (or brine) and gas. In particular, the present invention is directed to an apparatus and method for a three phase separator for separating well stream fluid having a water surge interface slot to accommodate entry of fluid in the event of a water surge.

2. Prior Art

Three phase separators are well known in the energy industry to separate a fluid flow delivered from a subterranean well or wells. It is also known that wells flow at different rates and that the composition of the fluid may vary from time to time. If the producing pressure becomes so low that the well will not produce at a desired flow rate, a variety of artificial lift methods may be employed. In one type of artificial lift method, plunger lift, periodic surges of liquids are produced.

A stream of fluids is delivered from the well. The purpose of the three phase separator is to separate an incoming feed or flow into a gaseous phase and two liquid phases—a lighter liquid phase primarily composed of liquid hydrocarbons and a water phase primarily composed of water or brine. The specific gravity of the hydrocarbon liquid phase is less than the water phase.

The three phase separator may take various configurations, but generally are either classified as horizontal or vertical or some combination thereof. In one design, a vessel extends and is normally horizontal. A cylindrical wall or shell of the vessel has opposed closed ends. The size of the vessel will vary depending on the flow conditions and the desired retention time. The three phases separate generally by gravity with the gaseous phase migrating to the top of the normally horizontal vessel. Below the gaseous phase, the liquid separates into two phases with the liquid hydrocarbon phase above the water phase. The gaseous phase is removed from the separator and is delivered for further processing or is flared-off. The water phase is removed from the separator and may be pumped back into the subterranean formation or otherwise disposed of. The liquid hydrocarbon phase is removed from the separator and is delivered for further processing.

The fluids in the separator are under pressure and valves and sensors may be employed as liquid level control mechanisms to control and remove the liquids. The liquid hydrocarbon phase and the water phase may be separated into compartments within the vessel.

There have been various designs in the past for three phase separators. For example, Polderman (U.S. Pat. No. 6,537,458) shows one example of a three phase separator. If during any time period, the gaseous phase increases, then the liquid level in the separator will go down while the gas level will increase. In the event of a surge or pulse of liquid into the separator, water may be permitted to flow into the separator box or chamber reserved for oil which frustrates the purpose of the three phase separator.

Coggins et al. (U.S. Pat. No. 4,208,196) discloses a horizontal separator in FIG. 1 with baffles to separate the hydrocarbon liquid from water phase.

Accordingly, it would be advantageous to provide an apparatus, method, and system for a three phase separator that may be deployed near the location of a production well or wells while accommodating a wide variety of flow conditions.

It would be advantageous to provide an apparatus, method and system for a three phase separator to accommodate fluid surges or pulses in the level of liquid into a separator.

Additionally, it would be advantageous to provide an apparatus, method and system for a three phase separator that avoids entry of the water phase into the hydrocarbon liquid phase.

SUMMARY OF THE INVENTION

The present invention is directed to a three phase separator to separate fluids under pressure into three phases. The three phase separator of the present invention includes a substantially horizontal tank having an axis which forms a fluid container. The axis of the container is generally parallel to ground level. The fluid container has a substantially cylindrical shell with a pair of opposed, substantially spherical ends forming a closed container.

A fluid inlet permits entry of a fluid under pressure from a well or wells into the fluid container. An optional splash plate within the container adjacent the inlet may be provided to reduce the flow of velocity of the incoming fluid.

Once inside the container, the fluids will tend to separate in directions perpendicular to the axis of the container.

The three phase separator includes an oil box within the fluid container. The oil box includes at least one sidewall which is perpendicular to the axis, a bottom which is parallel to the axis, and a baffle which is perpendicular to the axis. The sidewall and baffle each extend across the cylindrical shell and are secured thereto. Accordingly, the cylindrical shell, the sidewall, the bottom, and the baffle together form an open topped compartment within the fluid container. An adjacent water box includes a sidewall which is perpendicular to the axis, a bottom which is parallel to the axis, and a baffle which is perpendicular to the axis. Accordingly, the cylindrical shell, the sidewall, the bottom, and the baffle together form an open topped compartment within the fluid container.

A siphon nipple in the form of a tube extends through the bottom of the water box so that it is in fluid communication with the container. The siphon nipple is threadably attached to the bottom so that the level of an upper end of the siphon nipple is adjustable by rotating the siphon nipple. A gas outlet is provided in the fluid container so that the gaseous phases separated out in the separator may be removed.

A water removal mechanism is in fluid communication with the water box through a tube. When the level of water in the water box reaches a certain level, the water control valve is opened to release water under pressure.

An oil removal mechanism is in fluid communication with the oil box through a tube. When the level of oil in the oil box reaches a certain level, the oil control valve is opened to release oil under pressure.

A surge interface slot through the baffle of the water box permits entry of water from the fluid container into the water box. As the fluid container begins to fill with fluid, the gaseous phase will migrate above the level of the axis for removal through the gas outlet. Initially, the liquid phases will pass beneath the bottom of the oil box and the bottom of the water box.

As fluid continues to enter the container, a water seal will be formed preventing oil from moving under the bottom of the oil box and the bottom of the water box and adjacent the water baffle. As the overall level of liquid continues to rise, only water passes beneath the bottoms and into the siphon nipple.

As the level of liquid continues to rise and exceeds the level of the baffle of the oil box, oil will spill over into the oil box.

Since the oil separates above the water or brine level, no water or brine will be allowed to enter the oil box.

The water level will continue to rise until the oil/water interface level is controlled by the height of the opening of the siphon nipple into the water box.

The baffle of the water box includes a surge interface slot therethrough. In the event of a slug or surge of water into the fluid container, the surge interface slot will operate to prevent the water/oil interface level from exceeding the level of the oil baffle, thus preventing any water from entering the oil box. When the water level reaches the level of the interface slot, water will be permitted to flow from the container through the interface slot and into the water box.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
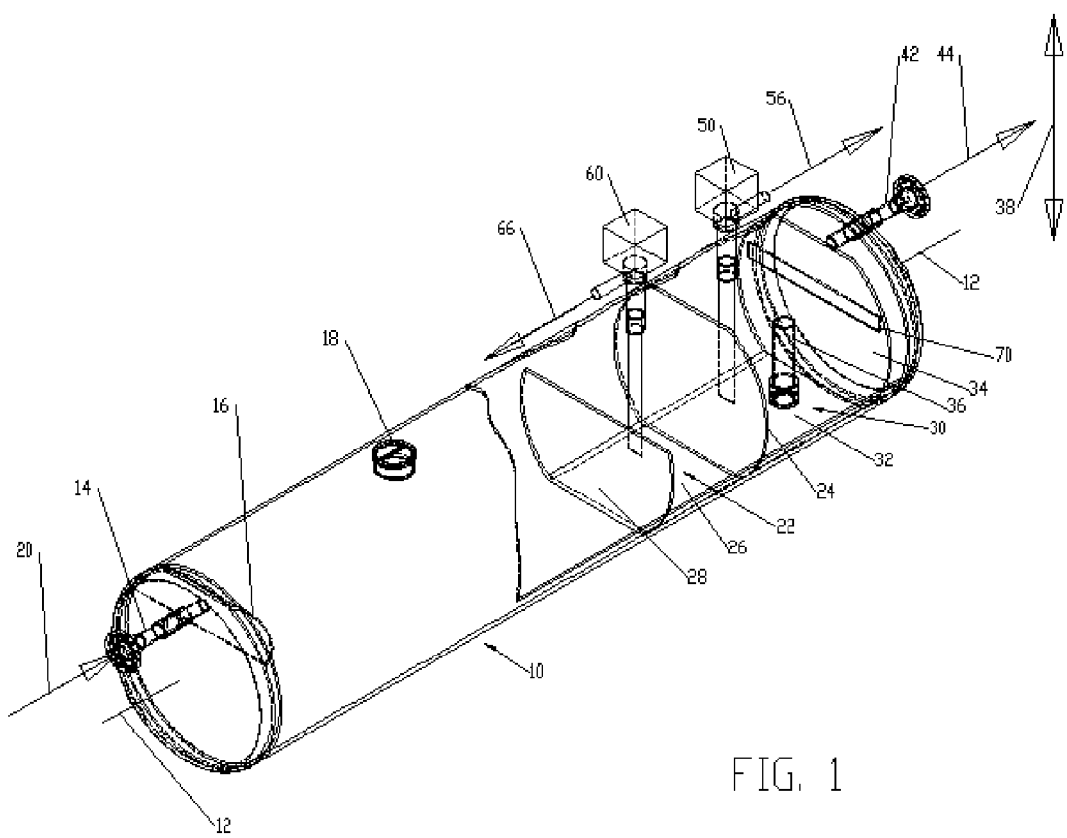
FIG. 1 is a perspective view of a three phase separator constructed in accordance with the present invention.

As seen in the perspective view in FIG. 1, a three phase separator of the present invention includes a substantially horizontal tank having an axis 12 which forms a fluid container 10. The axis 12 of the container is generally parallel to ground level (not shown). Framework (not shown) may be provided to support the separator. Optional equipment (such as heating coils or shells) might also be employed within the spirit of scope of the present invention.

The fluid container 10 has a substantially cylindrical shell with a pair of opposed, substantially spherical ends forming a closed container 10. A fluid inlet 14 permits entry of a fluid under pressure from a well or wells (not shown) into the fluid container 10 as shown by arrow 20. It will be appreciated that the inlet 14 may be located in alternate locations within the spirit and scope of the invention. An optional splash plate 16 within the container 10 adjacent the inlet 14 may be provided to reduce the flow velocity of the incoming fluid. A normally closed entry port 18 or entries may be provided to permit access into the fluid container 10 for maintenance and repair.

As will be seen, once inside the container 10, the fluids will tend to separate in directions perpendicular to the axis as shown by arrows 38.

The three phase separator includes an oil compartment, chamber or box 22 within the fluid container 10. The oil box 22 includes at least one sidewall 24 which is perpendicular to the axis 12, a bottom 26 which is parallel to the axis 12, and a baffle 28 which is perpendicular to the axis. The sidewall 24 and baffle 28 each extend across the cylindrical shell and are secured thereto, such as by welding. Accordingly, the cylindrical shell, the sidewall 24, the bottom 26 and the baffle 28 together form an open topped compartment within the fluid container 10.

An adjacent water compartment, chamber or box 30 includes a sidewall 24 which is perpendicular to the axis 12, a bottom 32 which is parallel to the axis 12, and a baffle 34 which is perpendicular to the axis. In the present case, the sidewall 24 is shared between the oil box 22 and the water box 30. Accordingly, the cylindrical shell, the sidewall 24, the bottom 32 and the baffle 34 together form an open topped compartment within the fluid container 10.

A siphon nipple 36 in the form of a tube extends through the bottom 32 of the water box 30 so that it is in fluid communication with the container 10. The siphon nipple 36 is threadably attached to the bottom 32 so that the level of an upper end of the siphon nipple is adjustable by rotating the siphon nipple.

There are, thus, three distinct compartments within the three phase separator, with the oil box 22 and the water box 30 within the larger fluid container 10.

A gas outlet 42 is provided in the fluid container 10 so that the gaseous phase separated out in the separator may be removed as shown by arrow 44. It will be appreciated that the gas outlet 42 may be located in alternate locations above the liquid levels to remove the gas.

A water removal mechanism 50 is in fluid communication with the water box 30 through a tube. The water removal mechanism 50 includes a liquid level sensor within the water box 30 and a water control valve. The liquid level sensor may be of a mechanical or other type to sense the liquid level in the water box. When the level of water in the water box reaches a certain level, the water control valve is opened to release water under pressure as shown by arrow 56.

The control valve may be a mechanical or pilot operated valve actuated by a float or a diaphragm control valve actuated by a displacement float. Other types of control valves may be employed within the spirit and scope of the invention.

An oil removal mechanism 60 is in fluid communication with the oil box 22 through a tube. The oil removal mechanism 60 includes a liquid level sensor within the oil box and an oil control valve. The liquid level sensor may be of a mechanical or other type to sense the liquid level in the oil box. When the level of oil in the oil box reaches a certain level, the oil control valve is opened to release oil under pressure as shown by arrow 66.

A surge interface slot 70 through the baffle 34 of the water box 30, permits entry of water from the fluid container 10 into the water box 30. The level of the surge interface slot is positioned above the level of the siphon nipple and below the level of the oil box baffle.

FIGS. 2 through 6 sequentially illustrate the process of the present invention.

Figure 2:
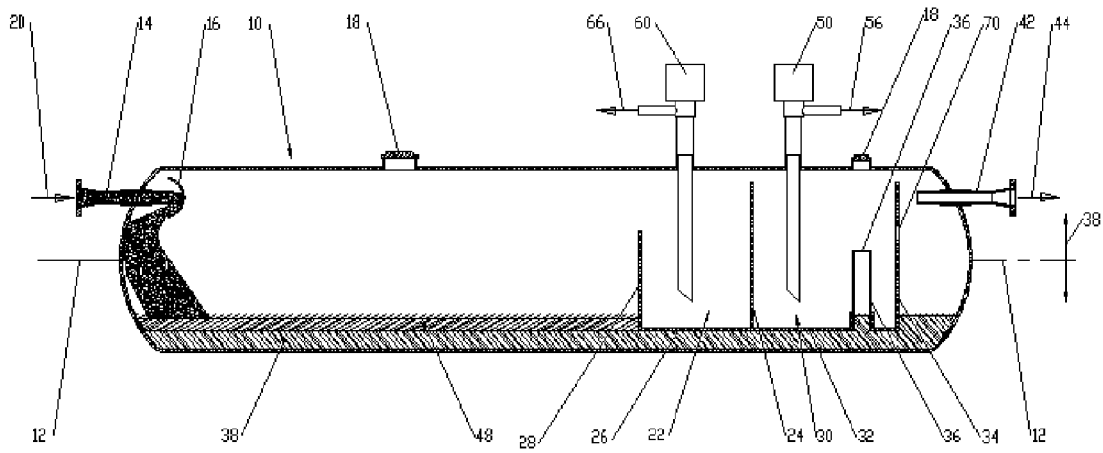
FIGS. 2 through 6 are sectional views of the three phase separator shown in FIG. 1 illustrating the sequence or process of the present invention.

Referring initially to FIG. 2, as the fluid container 10 is beginning to fill, the liquid phases will gather at the base of the container below the axis 12. Conversely, the gaseous phase will migrate above the level of the axis for removal through the gas outlet 42. Initially, as shown in FIG. 2, the liquids will pass beneath the bottom 26 of the oil box 22 and beneath the bottom 32 of the water box 30.

As fluid continues to enter the container 10 and the liquid phases separate, a "water seal" will be formed preventing oil from moving under the bottom 26 of the oil box and the bottom 32 of the water box and adjacent the water baffle 34.

Figure 3:
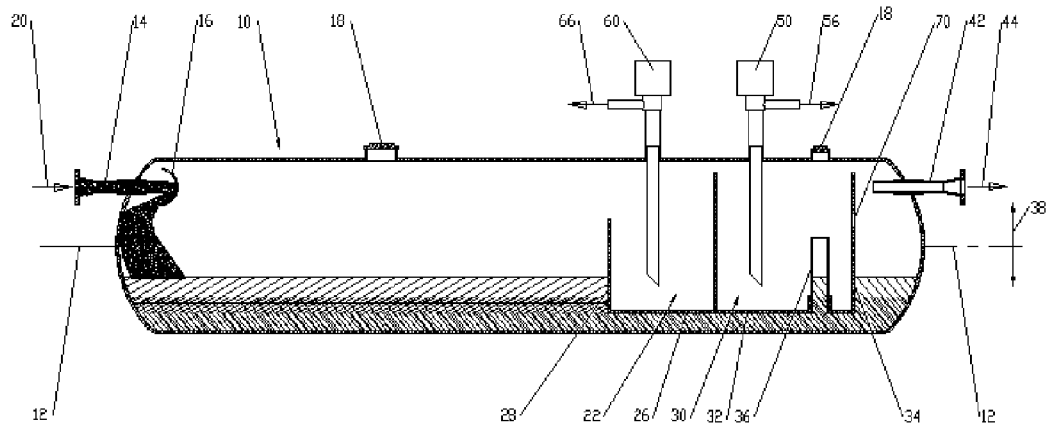

As seen in FIG. 3, the overall level of liquid continues to rise. Only water passes beneath the bottoms 26 and 32 and into the siphon nipple 36.

Figure 4:
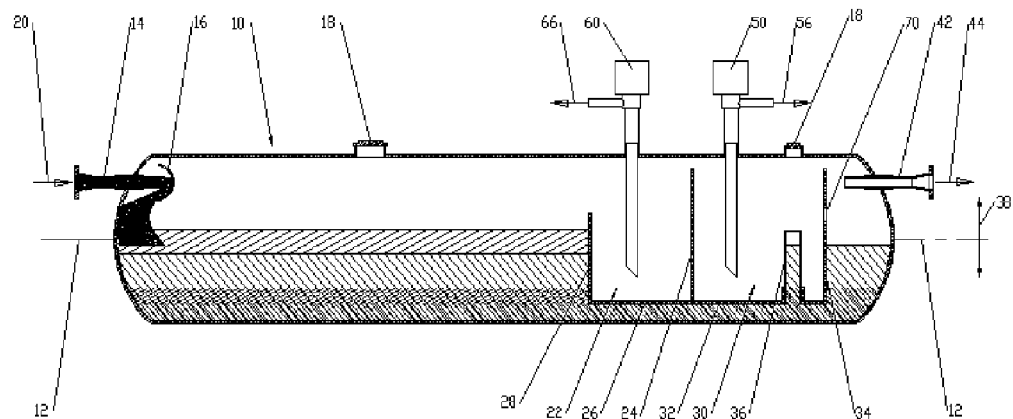

FIG. 4 shows the overall level of liquid rising.

Figure 5:
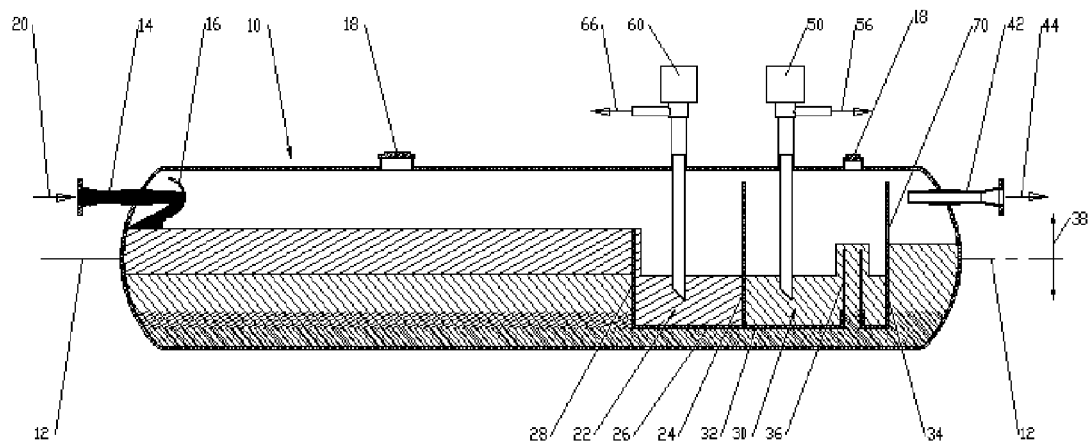

As seen in FIG. 5, as the level of liquid exceeds the level of the baffle 28 of the oil box 22, oil will spill over into the oil box 22. Since the oil separates above the water or brine, no water or brine will be allowed to enter into the oil box 22.

The water level will continue to rise until the oil/water interface level is controlled by the height of the opening of the siphon nipple 36. As seen in the water box 30 in FIG. 5, water will flow from the fluid container 10 into the siphon nipple 36, out of the siphon nipple and into the water box 30. The water liquid level control mechanism will operate to open a valve to discharge water from the fluid container.

Figure 6:
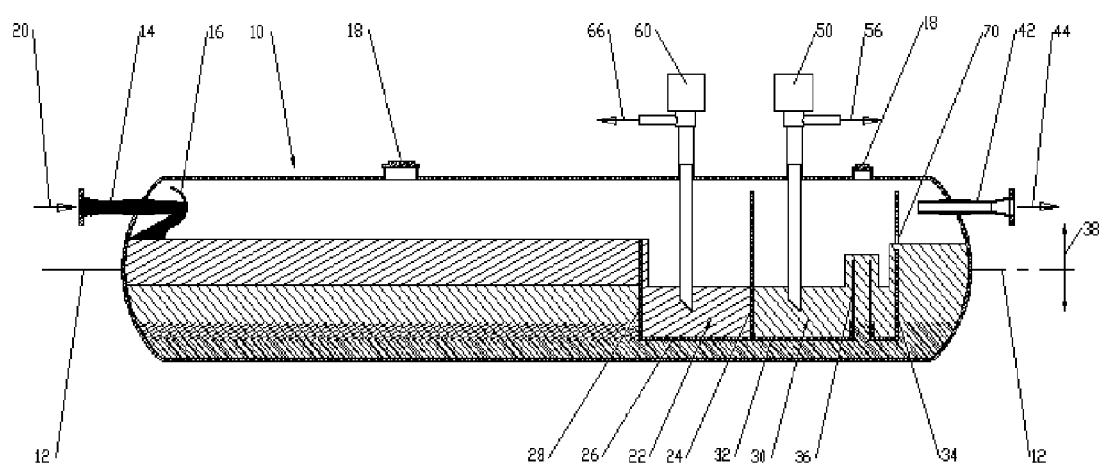

As best seen in FIG. 6, the baffle 34 of the water box 30 includes a surge interface slot 70. In the event of a slug or a surge of water into the fluid container 10, surge interface slot 70 will operate to prevent the water/oil interface level from exceeding the level of the oil baffle 28, thereby preventing any water from entering the oil box. As best seen in FIG. 6, the oil/water interface level has risen, since there is too much pressure drop through the siphon nipple for the water to be transferred quickly into the water box. When the water level reaches the level of the interface slot 70, water will be permitted to flow from the container into the water box. When the surge or slugging condition is over, the separator returns to a steady state condition of FIG. 5.

The level of the surge interface slot is positioned above the level of the siphon nipple and below the level of the oil box baffle.

Whereas, the present invention has been described in relation to the drawings attached hereto, it should be understood that other and further modifications, apart from those shown or suggested herein, may be made within the spirit and scope of this invention.

What is claimed is:

1. A three phase separator which comprises:
   a horizontal tank forming a fluid container having an inlet to said container to permit entry of a three phase fluid;
   an oil box within said fluid container having a bottom spaced above a bottom of said fluid container and at least one baffle separating said oil box from said fluid container;
   a water box within said fluid container having a bottom spaced above the bottom of said fluid container and at least one baffle separating said water box from said container;
   a water removal mechanism in communication with said water box to draw water therefrom; an oil removal mechanism in communication with said oil box to draw oil therefrom;
   a gas outlet to remove gas from said container; and
   a slot through said at least one baffle of said water box to permit entry of said water from said fluid container into said water box in the event of a water surge, said slot positioned below a top of said oil box baffle.

2. A three phase separator as set forth in claim 1 wherein said water removal mechanism includes a liquid level sensor and a water valve.

3. A three phase separator as set forth in claim 1 wherein said oil removal mechanism includes a liquid level sensor and an oil valve.

4. A three phase separator as set forth in claim 1 including at least one entry port for access to said fluid container.

5. A three phase separator as set forth in claim 1 including a siphon nipple extending through said bottom of said water box and terminating in said water box.

6. A three phase separator as set forth in claim 5 wherein said slot through said water box baffle is positioned at a level above said siphon nipple.

7. A three phase separator as set forth in claim 5 wherein said siphon nipple includes a height adjustment mechanism.

8. A method to separate a fluid into three phases, which method comprises:
   delivering a three phase fluid into a horizontal tank having a fluid container therein;
   permitting said three phase fluid in said fluid container to separate into a gaseous phase, a water liquid phase, and a hydrocarbon liquid phase;
   permitting said hydrocarbon liquid phase to enter an oil box in said fluid container having a bottom spaced above a bottom of said fluid container and at least one baffle wall when a level of said hydrocarbon phase exceeds a level of said baffle wall;
   permitting said water liquid phase to enter a water box having a bottom spaced above the bottom of said fluid container and at least one baffle wall; and
   permitting said water liquid phase to pass through an interface slot in said water box baffle wall in the event of a surge of water, said slot positioned below a top of said oil box baffle wall.

9. A method to separate as set forth in claim 8 including removing said gaseous phase from said fluid container through a gas outlet.

10. A method to separate as set forth in claim 8 including receiving said water liquid phase from said water box in cooperation with a liquid level sensor and a water valve.

11. A method to separate as set forth in claim 8 including removing said hydrocarbon liquid phase from said oil box in cooperation with a liquid level sensor and an oil valve.

12. A method to separate as set forth in claim 8 wherein said step of permitting said water liquid phase to enter a water box includes permitting said water liquid phase to pass through a siphon nipple through said bottom of said water box.

13. A method to separate as set forth in claim 12 wherein said interface slot is positioned above level of said siphon nipple.

14. A three phase separator which comprises:
    a horizontal tank forming a fluid container having an inlet to said container to permit entry of a three phase fluid;
    an oil box within said fluid container having (i) a bottom spaced above a bottom of said fluid container and parallel to an axis of said tank, and (ii) at least one baffle separating liquid in said oil box from said tank;
    a water box within said fluid container having (i) a bottom spaced above the bottom of said fluid container and parallel to an axis of said tank, and (ii) at least one baffle perpendicular to said axis separating said water box from said tank;
    a water removal mechanism in communication with said water box to draw water therefrom;
    an oil removal mechanism in communication with said oil box to draw oil therefrom;
    a gas outlet to remove gas from said container; and
    a slot through said at least one baffle of said water box to permit entry of water from said tank into said water box in the event of a water surge, said slot positioned below a top of said oil box baffle wall.

15. A three phase separator as set forth in claim 14 wherein said water removal mechanism includes a liquid level sensor and a water valve.

16. A three phase separator as set forth in claim 15 wherein said oil removal mechanism includes a liquid level sensor and an oil valve.

* * * * *